(12) United States Patent
Namba (10) Patent No.: US 10,338,509 B2
(45) Date of Patent: Jul. 2, 2019

(54) INFORMATION INPUTTING APPARATUS AND IMAGE FORMING APPARATUS HAVING INFORMATION INPUTTING APPARATUS

(71) Applicant: BROTHER KOGYO KABUSHIKI KAISHA, Nagoya-shi, Aichi-ken (JP)

(72) Inventor: Mamoru Namba, Nagoya (JP)

(73) Assignee: BROTHER KOGYO KABUSHIKI KAISHA, Nagoya-Shi, Aichi-Ken (JP)

(*) Notice: Subject to any disclaimer, the term of this patent is extended or adjusted under 35 U.S.C. 154(b) by 0 days.

(21) Appl. No.: 15/460,829

(22) Filed: Mar. 16, 2017

(65) Prior Publication Data

US 2017/0289371 A1 Oct. 5, 2017

(30) Foreign Application Priority Data

Mar. 31, 2016 (JP) ................................. 2016-073283

(51) Int. Cl.
*G03G 15/00* (2006.01)
*B41J 29/38* (2006.01)
*H04N 1/00* (2006.01)

(52) U.S. Cl.
CPC .......... *G03G 15/5016* (2013.01); *B41J 29/38* (2013.01); *H04N 1/00342* (2013.01); *H04N 1/00493* (2013.01); *H04N 1/00496* (2013.01); *H04N 2201/0094* (2013.01)

(58) Field of Classification Search
None
See application file for complete search history.

(56) References Cited

U.S. PATENT DOCUMENTS

2014/0253949 A1* 9/2014 Tsujimoto ............ H04N 1/0084
358/1.14
2017/0017184 A1* 1/2017 Yamada ............. G03G 15/5016

FOREIGN PATENT DOCUMENTS

JP 2010-114784 A 5/2010

* cited by examiner

*Primary Examiner* — Thomas S Giampaolo, II
(74) *Attorney, Agent, or Firm* — Merchant & Gould P.C.

(57) ABSTRACT

An information inputting apparatus includes: a circuit substrate configured to communicate with an information terminal through Near Field Communication; a placement surface on which the information terminal is to be put, the placement surface facing the circuit substrate; an operation unit disposed adjacent to the placement surface, the operation unit having an operation surface parallel to and protruding further than the placement surface; and a protrusion disposed between the placement surface and the operation unit, the protrusion having a height equal to or higher than a height of the operation surface at which the operation unit reacts.

7 Claims, 7 Drawing Sheets

INFORMATION INPUTTING APPARATUS AND IMAGE FORMING APPARATUS HAVING INFORMATION INPUTTING APPARATUS

CROSS REFERENCE TO RELATED APPLICATION

The present application claims priority from Japanese Patent Application No. 2016-073283 filed on Mar. 31, 2016, the disclosure of which is incorporated herein by reference in its entirety.

BACKGROUND

Field of the Invention

The present invention relates to an information inputting apparatus and an image forming apparatus having the information inputting apparatus and configured to communicate with an information terminal through Near Field Communication.

Description of the Related Art

There is conventionally known an image forming apparatus including a communication unit that communicates with an information terminal, such as a smartphone or a tablet device, through Near Field Communication. In such an image forming apparatus, the communication unit may be disposed in an operation panel that is provided with a contact surface. A user makes the information terminal approach the contact surface or brings the information terminal into contact with the contact surface. Such an operation panel includes an operation unit including operation buttons, a touch panel, or the like.

In the above image forming apparatus, when the user makes the information terminal approach the contact surface or brings the information terminal into contact with the contact surface, a part of the information terminal may be put or positioned over the operation unit. In that case, a surface of the information terminal on a side of the contact surface may cause an unintended erroneous operation of the operation unit. In order to solve that problem, an image forming apparatus described in Japanese Patent Application Laid-open No. 2010-114784 is configured such that a placement surface corresponding to the contact surface protrudes further than an operation surface of an operation panel.

SUMMARY

The image forming apparatus disclosed in Japanese Patent Application Laid-open No. 2010-114784, however, lacks unity in its overall configuration due to the difference in level around the placement surface. Japanese Patent Application Laid-open No. 2010-114784 also discloses a configuration in which a rotatable placement surface is provided separately from an operation panel. This configuration is complex, resulting in an increase in manufacturing cost.

An object of the present teaching is to provide an information inputting apparatus with a simple configuration in which an erroneous operation of an operation unit is not likely to occur at the time of communication with an information terminal and to provide an image forming apparatus having such an information inputting apparatus.

According to an aspect of the present teaching, there is provided an information inputting apparatus, including: an antenna composing a circuit substrate configured to communicate with an information terminal through Near Field Communication; a placement surface on which the information terminal is to be put, the placement surface facing the circuit substrate; an operation unit disposed adjacent to the placement surface, the operation unit having an operation surface parallel to and protruding further than the placement surface; and a protrusion disposed between the placement surface and the operation unit, the protrusion having a height equal to or higher than a height of the operation surface at which the operation unit reacts.

When a user puts the information terminal on the placement surface, a part of the information terminal may be positioned over the operation unit. In that case, in the above configuration, a surface of the information terminal on a placement surface side makes contact with the protrusion. Thus, the surface of the information terminal on the placement surface side has no contact with the operation unit. Even if the surface of the information terminal on the placement surface side has contact with the operation unit, since the protrusion has the height equal to or higher than the height of the operation surface at which the operation unit reacts, the operation unit does not react on the contact by the surface of the information terminal on the placement surface side.

According to the present teaching, bringing the surface of the information terminal on the placement surface side into contact with the protrusion may prevent the surface of the information terminal on the placement surface side from causing an erroneous operation of the operation unit. Namely, no erroneous operation of the operation unit is caused when the information terminal is put on the placement surface. Further, the protrusion with a simple configuration is provided instead of the difference in level between the placement surface and the operation unit, resulting in unity in the image forming apparatus.

DESCRIPTION OF THE EMBODIMENTS

Figure 1:
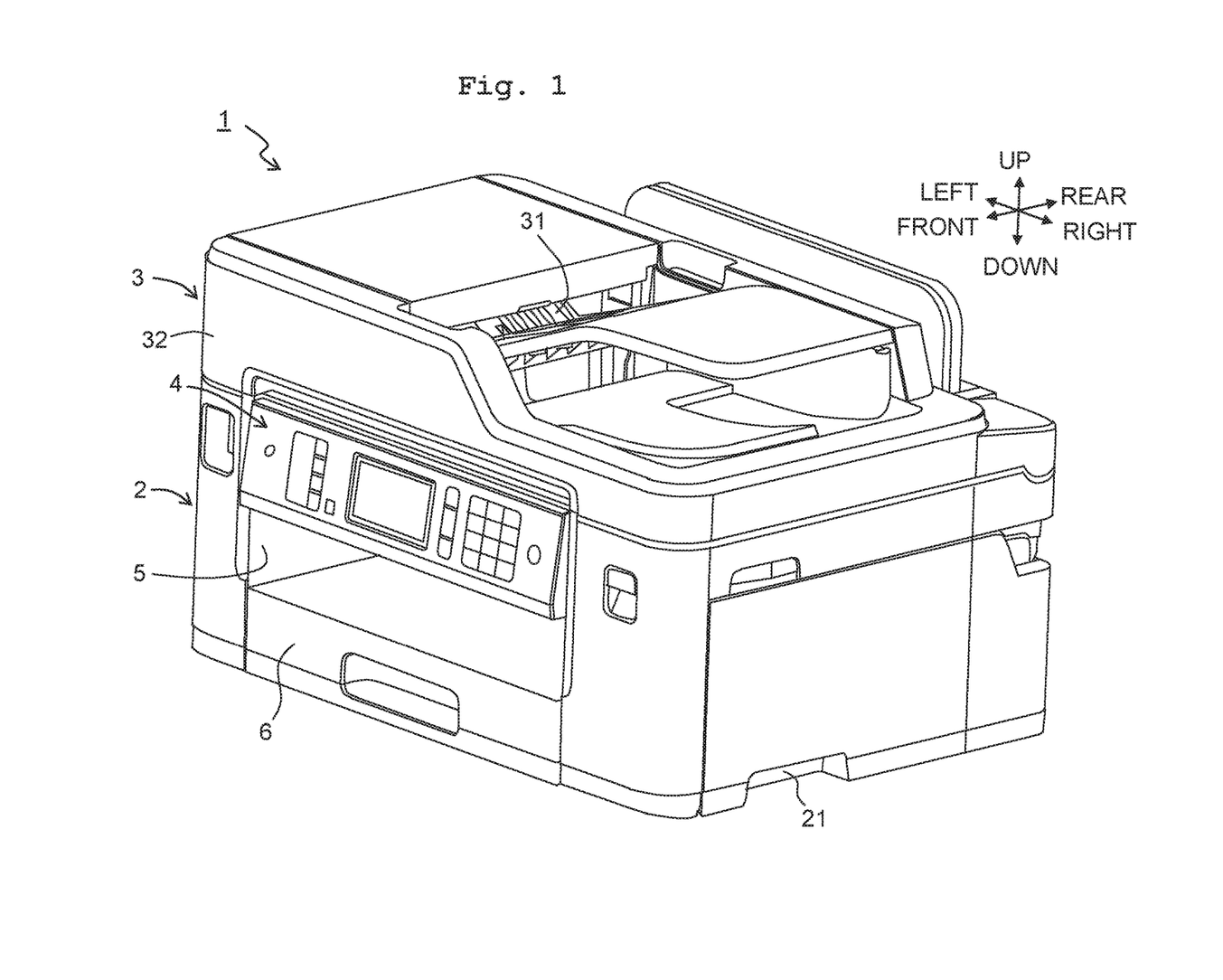
FIG. 1 is a perspective view of a multifunction peripheral according to an embodiment, wherein a panel unit stands upright.
Figure 2:
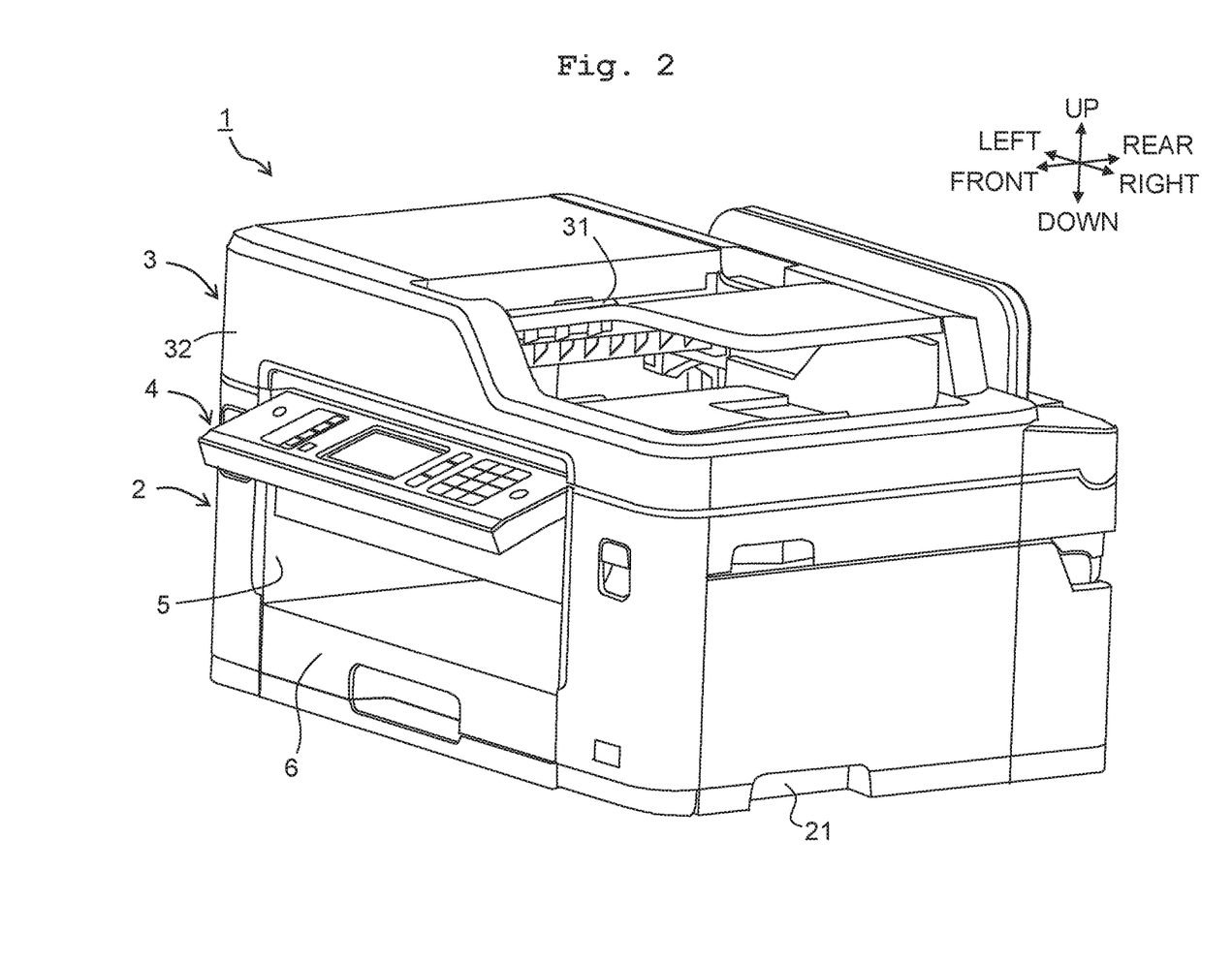
FIG. 2 is a perspective view of the multifunction peripheral according to the embodiment, wherein the panel unit is inclined.
Figure 3:
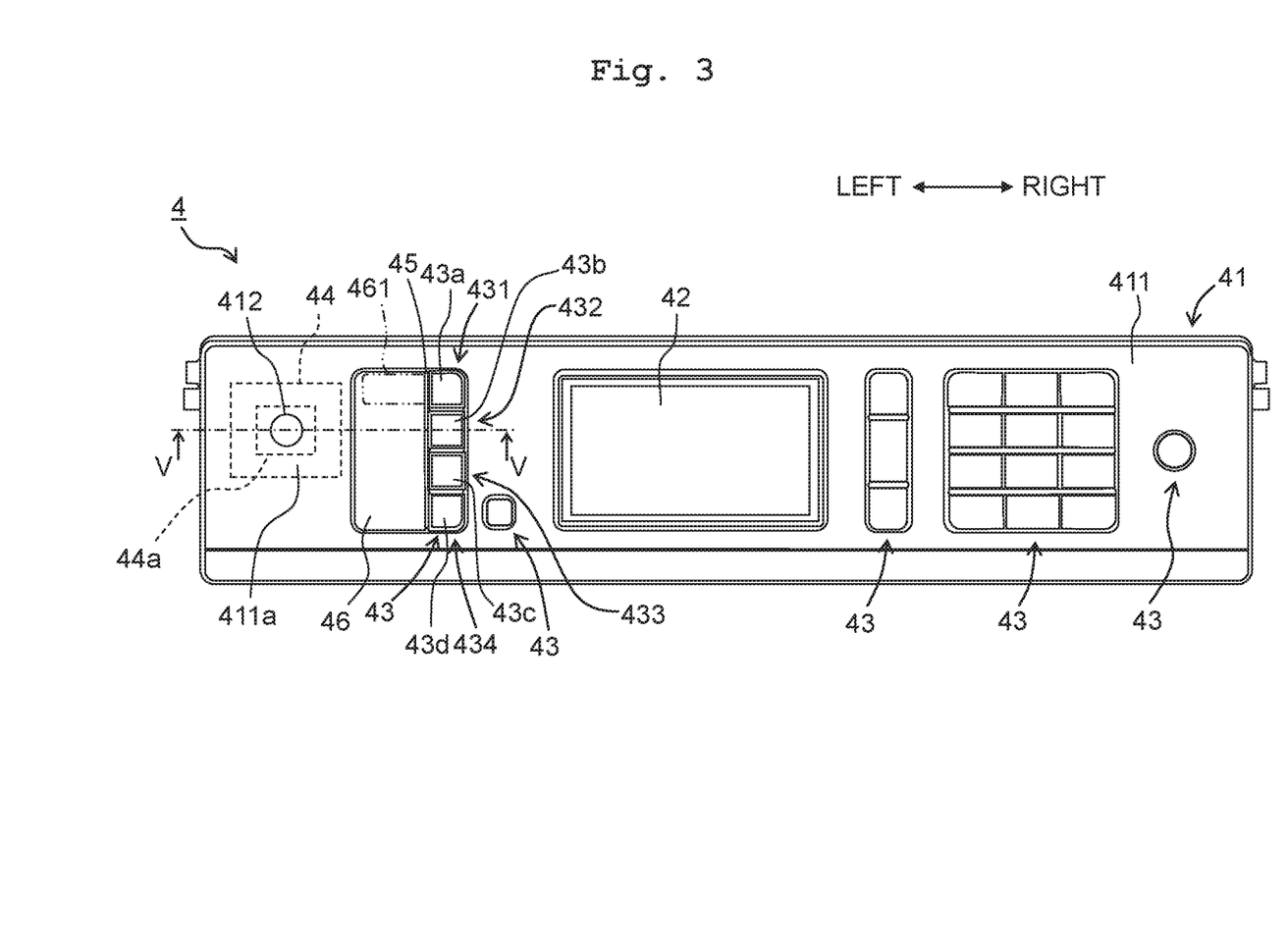
FIG. 3 is a front view of the panel unit.
Figure 4:
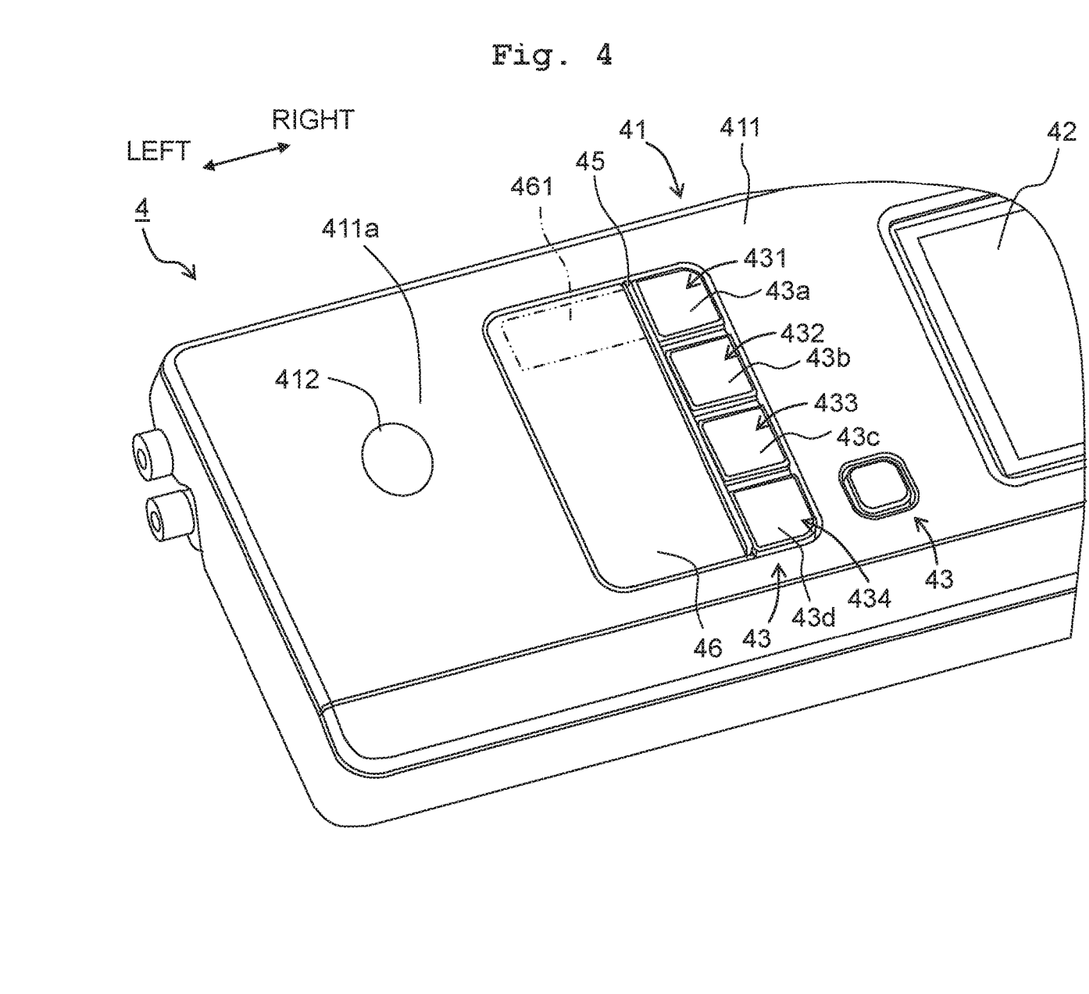
FIG. 4 is a partial enlarged perspective view of the panel unit.

In the following embodiment, an explanation will be made about an example in which the present teaching is applied to a multifunction peripheral including a printer as an image forming apparatus and a scanner as an image reading apparatus. Respective directions of front, rear, left, right, up, and down are defined based on a state where the multifunction peripheral is placed to be usable as depicted in FIG. 1.

<Overall Configuration of Multifunction Peripheral>

A multifunction peripheral 1 includes a printer unit 2 and a scanner unit 3 mounted on the printer unit 2.

A panel unit 4 operated by a user is provided on an upper front side of the printer unit 2. A discharge port 5 from which a sheet after printing is discharged is formed below the panel unit 4. A sheet cassette 6 in which sheets before printing are to be put is installed below the discharge port 5. Holding parts 21 are formed at left and right lower ends of the printer unit 2 to allow the user to lift the multifunction peripheral 1.

The printer unit 2 includes a built-in image forming unit (not depicted) that forms an image on a sheet sent from the sheet cassette 6 or a back-side feed tray and then sends the sheet having the image to the discharge port 5. The system of the image forming unit is not particularly limited, and may be, for example, an ink-jet print system or laser-print system.

The scanner unit 3 includes a flatbed cover 32 and an image reading unit (not depicted) disposed at a position above the printer unit 2 and below the cover 32. The image reading unit may be, for example, an image scanner. The image scanner includes an image sensor that irradiates a document as a reading target with light from a light source and converts the reflected light into an electrical signal. A motor reciprocatingly moves the image sensor in a left-right direction. The scanner unit 3 also includes an Automatic Document Feeder (ADF) 31 that reads an image on a recording surface of the document with the image sensor after separating documents one by one.

Of components of the multifunction peripheral 1, at least a controller (not depicted) is provided in a casing of the multifunction peripheral 1. The controller accepts input from the panel unit 4 and controls operations of the image forming unit and the image reading unit. The controller is mounted with a microcomputer executing a variety of processing through which a printer function, scan function, copy function, and the like of the multifunction peripheral 1 are achieved.

<Configuration of Panel Unit>

The panel unit 4 includes a case 41, a display 42, an operation unit 43, a placement surface 411a corresponding to a contact surface, a Near Field Communication (NFC) substrate 44 that is an exemplary circuit substrate, a rib 45 that is an exemplary protrusion, and a label area 46. The user positions an information terminal close to the contact surface or brings the information terminal into contact with the contact surface, thereby allowing the information terminal to approach the NFC substrate 44 contained in the panel unit 4.

The case 41, which is a thin rectangular parallelopiped shaped case, forms an outer shape of the panel unit 4. The case 41 contains parts or components of the panel unit 4. A side of an operation surface of the case 41 is formed integrally by a flat panel 411. This enhances unity when respective parts of the panel unit 4 are arranged in the panel 411, resulting in high designability.

The display 42, which displays states, functions, and the like of the multifunction peripheral 1, is disposed in the vicinity of the center of the panel 411. The display 42 may be, for example, a liquid crystal display, electroluminescence display, or the like. The display 42 may be overlapped with a resistive touch panel or capacitance type touch panel.

The operation unit 43 operated by the user includes push buttons that are arranged at various positions of the panel 411. Those usable as the push buttons include, for example, an automatic reset switch that is switched on only when being pushed. In the present embodiment, four push buttons arranged on the left of the display 42 are referred to as first to fourth push buttons 431 to 434. Operation surfaces 43a to 43d of the first to fourth push buttons 431 to 434 are parallel to the panel 411 and protrude further than the panel 411. Various functions desired by the user may be assigned to the first to fourth push buttons 431 to 434.

The operation unit 43 is not limited to include the push buttons, provided that the user may perform the push operation. The operation unit 43 may include, for example, a touch key arranged on the touch panel.

The placement surface 411a is disposed on the left of the first to fourth push buttons 431 to 434. An information terminal P, such as a smartphone and a tablet terminal, is to be put on the placement surface 411a (including a case in which the information terminal P approaches the placement surface 411a and a case in which the information terminal P has contact with the placement surface 411a) to perform data communication with the multifunction peripheral 1. The placement surface 411a is formed in a part of the panel 411 in such a manner that the operation surfaces 43a to 43d of the first to fourth push buttons 431 to 434 are parallel to the placement surface 411a and protrude further than the placement surface 411a.

The placement surface 411a includes a mark 412 printed thereon by which the user may put the information terminal P on the mark 412 to perform radio communication between the information terminal P and the multifunction peripheral 1.

The NFC substrate 44 is disposed in the case 41 to face the placement surface 411a. The NFC substrate 44 is a circuit substrate that may communicate with the information terminal P placed on the placement surface 411 through the Near Field Communication system. The NFC substrate 44 is composed of a loop antenna 44a, communication circuit, detector circuit, and the like. The loop antenna 44a is connected to the NFC substrate 44 and has a function transmitting and receiving a radio wave for communication with the information terminal P. The communication circuit has a function performing signal processing of the radio wave transmitted and received. The detector circuit has a function detecting a current flowing through the loop antenna 44a to detect intensity or strength of the radio wave transmitted and received by the loop antenna 44a.

The communication system between the multifunction peripheral 1 and the information terminal P is not limited to the NFC system, and it may be, for example, Near Field Communication by use of Bluetooth system or infrared communication system.

The rib 45, which is a protrusion provided between the placement surface 411a and the first to fourth push buttons 431 to 434, is formed integrally with the panel 411. The rib 45 has a height equal to or higher than a height, of the operation surface 43a to 43d of the first to fourth push buttons 431 to 434, at which the buttons react by being pushed. The rib 45 is a single member extending linearly on the left side of the first to fourth push buttons 431 to 434 in a direction orthogonal to the left-right direction.

Figure 5:
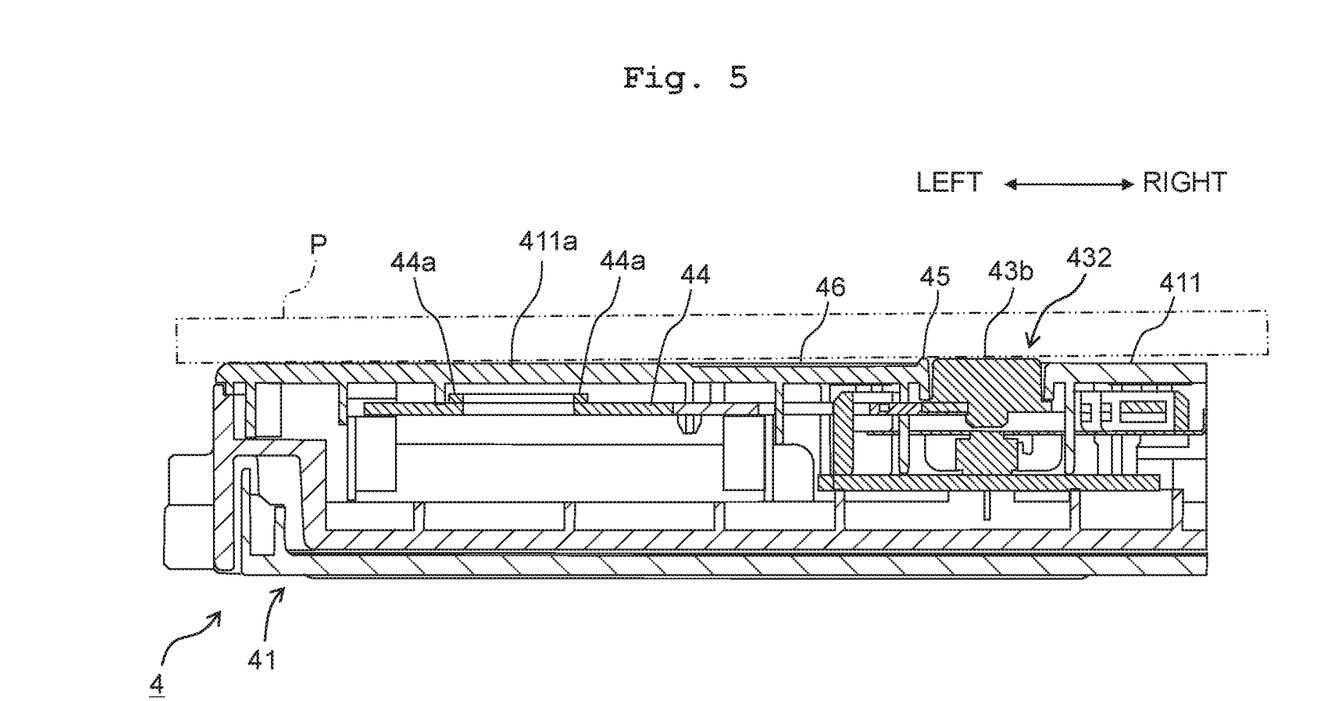
FIG. 5 is a cross-sectional view taken along a line V-V of FIG. 3.

When the user puts the information terminal P on the placement surface 411a, a part of the information terminal P may be positioned over the first to fourth push buttons 431 to 434. In that case, the rib 45 makes contact with a surface of the information terminal P on a placement surface 411a side, as depicted in FIG. 5.

When a part of the information terminal P is positioned over the first to fourth push buttons 431 to 434, the surface of the information terminal P on the placement surface 411a side has no contact with the first to fourth push buttons 431 to 434. Even when the surface of the information terminal P on the placement surface 411a side has contact with the first to fourth push buttons 431 to 434, since the rib 45 has the height equal to or higher than the height, of the operation surfaces 43a to 43d of the first to fourth push buttons 431 to 434, at which the buttons react by being pushed, the unintentional contact does not cause the first to fourth push buttons 431 to 434 to react. Accordingly, when the information terminal P is put on the placement surface 411a, the surface of the information terminal P on the placement surface 411a side is prevented from pushing the first to fourth push buttons 431 to 434 accidentally, which eliminates the possibility of erroneous operations.

The single linear rib 45 has a simple structure, eliminates the need of the difference in level between the placement surface 411a and the first to fourth push buttons 431 to 434, and increases unity between the rib 45 and the first and fourth push buttons 431 to 434. Thus, the rib 45 produces high designability.

The rib 45 extending along the first to fourth push buttons 431 to 434 prevents erroneous operations of the first to fourth push buttons 431 to 434 effectively. Arranging the placement surface 411a, the first to fourth push buttons 431 to 434, and the rib 45 on the flat panel 411 increases unity between the three members, thus resulting in high designability.

The rib 45 preferably has a height equal to or higher than a height, of the operation surfaces 43a to 43d of the first to fourth push buttons 431 to 434, at which no operation is being performed on the buttons. The rib 45 having a greater height prevents erroneous operations of the first to fourth push buttons 431 to 434 more effectively.

The label area 46 is an area on which labels 461 indicating function names respectively assigned to the first to fourth push buttons 431 to 434 are to be affixed. The label area 46 has a substantially rectangular shape, and it is provided on the opposite side of the first to fourth push buttons 431 to 434 across the rib 45. The labels 461 may be affixed on the left of the first to fourth push buttons 431 to 434, respectively.

In the present embodiment, the label area 46 is a concave part formed in a surface of the panel 411. The label area 46 may be flush with the panel 411, that is, it may have the same height as the panel 411. Or, the label area 46 may be a convex part formed in the panel 411.

When the labels 461 are affixed on the label area 46, right ends of the labels 461 respectively corresponding to the first to fourth push buttons 431 to 434 may be aligned by positioning the right ends of the labels 461 while being brought into contact with the left surface of the rib 45.

As described above, the rib 45 is a design separating the first to fourth push buttons 431 to 434 from the labels 461 and a positioning reference for the labels 461. Arranging the label area 46, the rib 45, and the first to fourth push buttons 431 to 434 in the rectangular concave part of the panel 411 enhances the unity therebetween, thus resulting in high designability.

First Modified Embodiment

Figure 6:
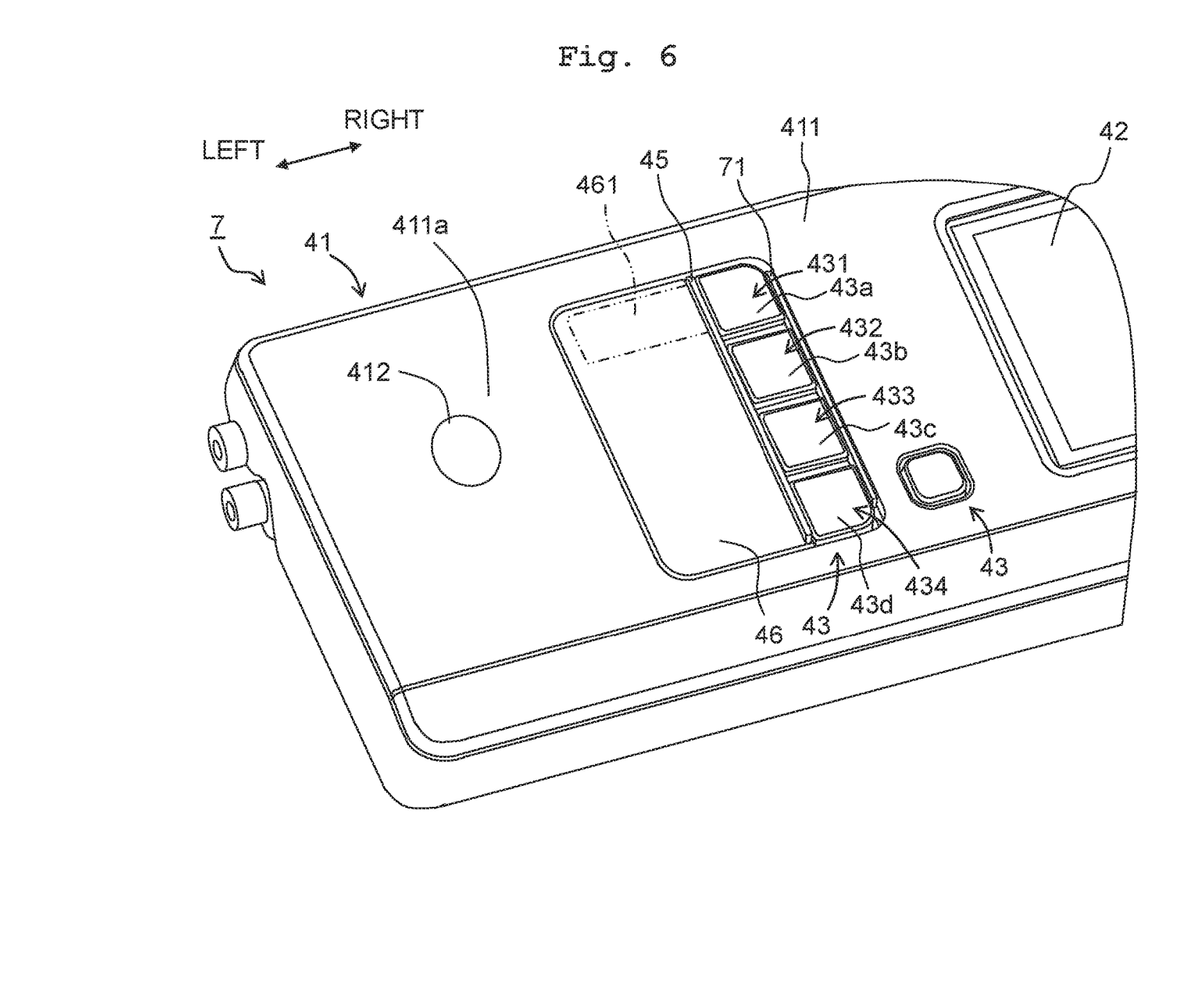
FIG. 6 is a partial enlarged perspective view of a panel unit according to a first modified embodiment.

A panel unit 7 depicted in FIG. 6 according to a first modified embodiment is different from the above embodiment in that the panel unit 7 includes an auxiliary rib 71 as an exemplary auxiliary protrusion. Other configurations except the auxiliary rib 71 are the same as those of the above embodiment, and thus any explanation therefor will be omitted.

The auxiliary rib 71, which is the auxiliary protrusion provided on the opposite side of the rib 45 across the first to fourth push buttons 431 to 434, is formed integrally with the panel 411. The auxiliary rib 71 has a height at least equal to or higher than the height, of the operation surface 43a to 43d of the first to fourth push buttons 431 to 434, at which the buttons react by being pushed. The auxiliary rib 71 is a single member extending linearly on the right side of the first to fourth push buttons 431 to 434 in the direction orthogonal to the left-right direction.

The user may put the information terminal P on the placement surface 411a at various angles. The surface of the information terminal P on the placement surface 411a side makes contact with the auxiliary rib 71 at whatever angle the information terminal P is put. This prevents the surface of the information terminal P on the placement surface 411a side from making contact with the first to fourth push buttons 431 to 434, thus preventing erroneous operations of the first to fourth push buttons 431 to 434 effectively. The rib 45 and the auxiliary rib 71 may be connected to each other to surround the circumference of the first to fourth push buttons 431 to 434.

Second Modified Embodiment

Figure 7:
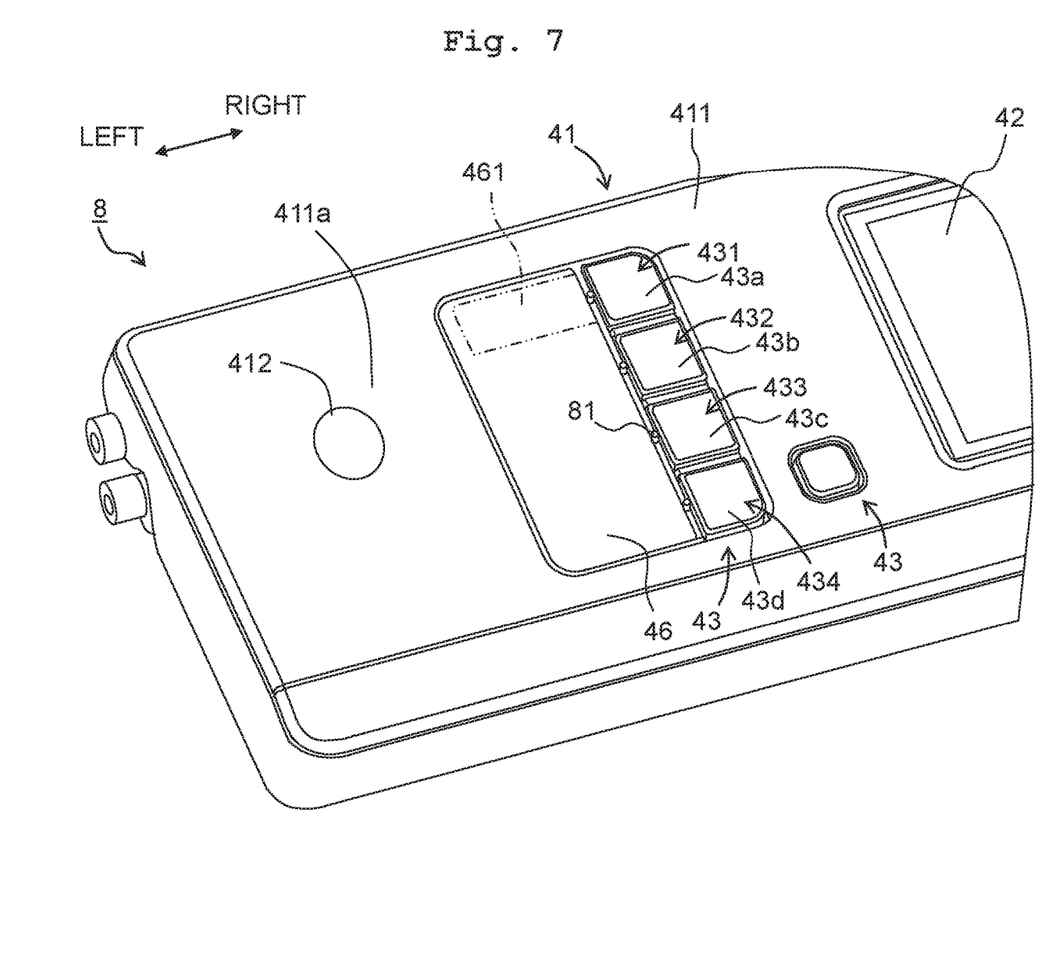
FIG. 7 is a partial enlarged perspective view of a panel unit according to a second modified embodiment.

A panel unit 8 depicted in FIG. 7 according to a second modified embodiment is different from the above embodiment in that the panel unit 8 includes four bosses 81 as an exemplary protrusion. Other configurations except the bosses 81 are the same as those of the above embodiment, and thus any explanation therefor will be omitted.

Each of the bosses 81, which is a substantially cylindrical protrusion, is provided on the left of the corresponding one of the first to fourth push buttons 431 to 434. The height of the bosses 81 is the same as that of the rib 45. It is only required that the bosses 81 be provided between the placement surface 411a and the first to fourth push buttons 431 to 434. The number of bosses 81 may be at least one, two or three, or five or more.

As with the above embodiment, when the user puts the information terminal P on the placement surface 411a, the bosses 81 may prevent the surface of the information terminal P on the placement surface 411a side from erroneously pushing the first to fourth push buttons 431 to 434. The auxiliary rib 71 of the first modified embodiment may be replaced with the bosses 81.

Effects of the Embodiment

The multifunction peripheral 1 according to the above embodiment includes: the NFC substrate 44 that is a communication unit configured to communicate with the information terminal P through Near Field Communication; the placement surface 411a on which the information terminal P is to be put, the placement surface 411a facing the NFC substrate 44; first to fourth push buttons 431 to 444 each of which is an operation unit disposed adjacent to the placement surface 411a and including operation surfaces 43a to 43d parallel to the placement surface 411a, wherein the operation surfaces 43a to 43d protrude further than the placement surface 411a; and the rib 45 that is a protrusion provided between the placement surface 411a and the first to fourth push buttons 431 to 434 and having the height equal to or higher than the height, of the operation surfaces 43a to 43d of the first to fourth push buttons 431 to 434, at which the buttons react by being pushed.

In that configuration, even when the user positions a part of the information terminal P over the first to fourth push buttons 431 to 434, the surface of the information terminal P on the placement surface 411a side makes contact with the rib 45. This prevents the first to fourth push buttons 431 to 434 from being erroneously operated by the surface of the information terminal P on the placement surface 411a side. Thus, erroneous operations of the first to fourth push buttons 431 to 434 may be prevented which would be otherwise caused when the information terminal P is put on the placement surface 411a. Further, the above configuration includes the rib 45 with a simple configuration, instead of the difference in level between the placement surface 411a and the first to fourth push buttons 431 to 434. Thus, the above configuration has high designability.

The multifunction peripheral 1 according to the above embodiment includes the rib 45 extending along the first to fourth push buttons 431 to 434.

In that configuration, the rib 45 formed to extend along the first to fourth push buttons 431 to 434 prevents erroneous operations of the first to fourth push buttons 431 to 434 effectively.

The multifunction peripheral 1 according to the above embodiment includes the rib 45 formed as a single rib.

In that configuration, unity between the rib 45 and the first to fourth push buttons 431 to 434 increases, resulting in high designability.

In the multifunction peripheral 1 according to the above embodiment, the height of the rib 45 is equal to or higher than the height, of the operation surfaces 43a to 43d of the first to fourth push buttons 431 to 434, at which no operation is being performed on the buttons.

In that configuration, the rib 45 with a greater height prevents erroneous operations of the first to fourth push buttons 431 to 434 more effectively.

In the multifunction peripheral 1 according to the above embodiment, the placement surface 411a, the first to fourth push buttons 431 to 434, and the rib 45 are arranged on the integrally formed flat panel 411.

In that configuration, unity between the placement surface 411a and the first to fourth push buttons 431 to 434 and the rib 45 increases, resulting in high designability.

The multifunction peripheral 1 according to the above embodiment includes the label area 46 on which the labels 461 are to be affixed on the opposite side of the first to fourth push buttons 431 to 434 across the rib 45.

In that configuration, the rib 45 is a design separating the first to fourth push buttons 431 to 434 from the labels 461 and a positioning reference for the labels 461.

The panel unit 7 according to the first modified embodiment includes the auxiliary rib 71 that is the auxiliary protrusion disposed on the opposite side of the rib 45 across the first to fourth push buttons 431 to 434 and having the height equal to or higher than the height, of the operation surfaces 43a do 43d of the first to fourth push buttons 431 to 434, at which the buttons react by being pushed.

In that configuration, the auxiliary rib 71 may prevent erroneous operations of the first to fourth push buttons 431 to 434 effectively, even when the user puts the information terminal P on the placement surface 411a at any angle.

What is claimed is:

1. An information inputting apparatus, comprising:
   an antenna composing a circuit substrate configured to communicate with an information terminal through Near Field Communication;
   a placement surface on which the information terminal is to be put, the placement surface facing the circuit substrate in a first direction which is orthogonal to the placement surface;
   an operation unit disposed adjacent to the placement surface in a second direction which is along the placement surface, the operation unit having a plurality of operation surfaces arranged in a third direction which is along the placement surface and intersects with the second direction, each of the plurality of operation surfaces being parallel to the placement surface and protruding further in the first direction than the placement surface; and
   a protrusion disposed between the placement surface and the plurality of operation surfaces of the operation unit in the second direction, the protrusion extending along substantially an entire length of the placement surface in the third direction, the protrusion having a height higher than a height, of any of the plurality of operation surfaces, at which the operation unit reacts,
   wherein the protrusion extends along the third direction to separate the plurality of operation surfaces from the placement surface in the second direction.

2. The information inputting apparatus according to claim 1, wherein the protrusion is a single rib.

3. The information inputting apparatus according to claim 1, wherein the height of the protrusion is equal to or higher than a height of the operation unit at which no operation is being performed on the operation unit.

4. The information inputting apparatus according to claim 1, wherein the placement surface, the operation unit, and the protrusion are arranged on an integrally formed flat panel.

5. The information inputting apparatus according to claim 1, further comprising a label area on which a label is to be affixed, the label area being on a side opposite to the operation unit across the protrusion.

6. The information inputting apparatus according to claim 1, further comprising an auxiliary protrusion disposed on a side opposite to the protrusion across the operation unit, the auxiliary protrusion having a height equal to or higher than the height of the operation surface at which the operation unit reacts.

7. An image forming apparatus comprising:
   an image forming unit configured to form an image on a sheet; and
   the information inputting apparatus as defined in claim 1.

* * * * *